United States Patent
Papaiconomou et al.

(10) Patent No.: US 11,254,999 B2
(45) Date of Patent: Feb. 22, 2022

(54) IONIC LIQUID-ACID AQUEOUS TWO-PHASE SYSTEM

(71) Applicants: CENTRE NATIONAL DE LA RECHERCHE SCIENTIFIQUE, Paris (FR); INSTITUT POLYTECHNIQUE DE GRENOBLE, Grenoble (FR); UNIVERSITÉ SAVOIE MONT BLANC, Chambery (FR); UNIVERSIDADE DE AVEIRO, Aveiro (PT)

(72) Inventors: Nicolas Papaiconomou, Nice (FR); Joao Manuel Da Costa E Araujo Pereira Coutinho, Ilhavo (PT); Matthieu Gras, Corenc (FR); Isabelle Billard, Grenoble (FR)

(73) Assignees: CENTRE NATIONAL DE LA RECHERCHE SCIENTIFIQUE, Paris (FR); INSTITUT POLYTECHNIQUE DE GRENOBLE, Grenoble (FR); UNIVERSIDADE DE AVEIRO, Aveiro (PT); UNIVERSITÉ SAVOIE MONT BLANC, Chambery (FR)

( * ) Notice: Subject to any disclaimer, the term of this patent is extended or adjusted under 35 U.S.C. 154(b) by 290 days.

(21) Appl. No.: 16/349,416

(22) PCT Filed: Nov. 13, 2017

(86) PCT No.: PCT/EP2017/079056
§ 371 (c)(1),
(2) Date: May 13, 2019

(87) PCT Pub. No.: WO2018/087364
PCT Pub. Date: May 17, 2018

(65) Prior Publication Data
US 2019/0360071 A1    Nov. 28, 2019

(30) Foreign Application Priority Data

Nov. 14, 2016 (FR) ...................... 16 60999

(51) Int. Cl.
C22B 3/00 (2006.01)
B01D 11/04 (2006.01)
C22B 3/36 (2006.01)

(52) U.S. Cl.
CPC ...... *C22B 23/0484* (2013.01); *B01D 11/0492* (2013.01); *C22B 3/36* (2021.05)

(58) Field of Classification Search
CPC ............. C22B 23/0484; C22B 3/0035; B01D 11/0492
(Continued)

(56) References Cited

U.S. PATENT DOCUMENTS

2014/0246370 A1    9/2014    Strassner et al.

FOREIGN PATENT DOCUMENTS

CN    101457292 A    6/2009

OTHER PUBLICATIONS

Onghena et al., Recovery of Scandium(III) from Aqueous Solutions by Solvent Extraction with the Functionalized Ionic Liquid Betainium Bis(trifluoromethylsulfonyl)imide, Industrial & Engineering Chemistry Research, 2015, pp. 1887-1898, vol. 54.
(Continued)

*Primary Examiner* — Melissa S Swain
(74) *Attorney, Agent, or Firm* — Nixon & Vanderhye

(57) ABSTRACT

Disclosed is a process for extracting or separating metal ions using a composition including: an ionic liquid of formula $C^+,-X$, in which: $C^+$ is an onium cation including at least one hydrocarbon chain $R^1$ including from 6 to 20 carbon atoms; $X^{p-}$ is an anion of charge p, the ionic liquid having a solubility in water at 20° C. of at least 10 g/l; an acid; and water. The composition includes two liquid phases: a phase enriched in ionic liquid $\phi_{IL}$; and a phase enriched in water $\phi_w$, the pH of which is less than or equal to 4.7. The composition is useful for extracting a metal ion from an acidic aqueous medium including a metal ion, for separating metal ions from an aqueous medium including at least two metal ions or for purifying an acidic aqueous solution including a metal ion.

13 Claims, 2 Drawing Sheets

(58) Field of Classification Search
USPC .......................................................... 423/140
See application file for complete search history.

(56) References Cited

OTHER PUBLICATIONS

Wellens et al., "An enviromentally friendlier approach to hydrometallurgy: highly selective separation of cobalt from nickel by solvent extraction with undiluted phosphonium ionic liquids", Green Chemistry, 2012, pp. 1657-1665, vol. 14, XP055225618.

Hoogerstraete et al., "Removal of transition metals from rare earths by solvent extraction with an undiluted phosphonium ionic liquid: separations relevant to rare-earth magnet recycling", Green Chemistry, 2013, pp. 919-927, vol. 15, XP002771973.

De Los Rios et al., "Removal of Metal Ions from Aqueous Solutions by Extraction with Ionic Liquids", Jounral of Chemical & Engineering Data, 2010, pp. 605-608, vol. 55, No. 2, XP055040367.

International Search Report, dated Feb. 23, 2018, from corresponding PCT application No. PCT/EP2017/079056.

French Search Report, dated Jul. 13, 2017, from corresponding FR application No. 1660999.

Hoogerstraete et al., "Homogeneous Liquid-Liquid Extraction of Metal Ions with a Functionalized Ionic Liquid", The Journal of Physical Chemistry Letters, 2013, pp. 1659-1663, vol. 4.

Ghosh et al., "Ionic liquid-salt based aqueous biphasic system for separation of 109Cd from silver target," J Radioanal Nucl Chem (2014) 302:925-930.

Onghena et al., "Separation of cobalt and nickel using a thermomorphic ionic-liquid-based aqueous biphasic system," Chem. Commun., 2015, 51, 15932.

IONIC LIQUID-ACID AQUEOUS TWO-PHASE SYSTEM

The present invention relates to a composition comprising two liquid phases, one enriched in ionic liquid, the other enriched in acidic aqueous solution, wherein such a composition corresponds to an biphasic ionic-acid liquid aqueous system, and its uses, in particular for extracting metal ions.

Metal ions are generally soluble in acidic, or even strongly acidic, aqueous solutions, and poorly soluble in neutral or basic solutions. Few extraction media are compatible with these acidic conditions.

It is known to use organic solvents, such as kerosene for extracting metal ions from an aqueous acidic phase. These organic solvents are, however, toxic and flammable.

Ionic liquids are increasingly considered as alternative solvents to organic solvents. An ionic liquid is a salt having a melting temperature below 100° C. Ionic liquids are not explosive, and so the risk of explosion or atmospheric pollution is avoided. Ionic liquids are not volatile and have no vapor pressure. The extractant phase therefore remains stable and inert during prolonged storage.

The literature reports the use of hydrophobic ionic liquids that are highly insoluble in water to extract metal ions from aqueous phases. Hydrophobic ionic liquids, however, have the drawback of being generally not only expensive, but also viscous, which makes their handling complex.

In addition, biphasic aqueous systems (ABS) comprising two immiscible aqueous solutions, also make it possible to carry out liquid-liquid extractions without the use of organic or volatile solvents. Most biphasic aqueous systems are based on polymer/salt phases, polymer/polymer phases, or salt/salt phases.

Some biphasic aqueous ionic hydrophilic/inorganic salt systems are known. The appearance of two phases is noted beyond certain concentrations of hydrophilic ionic liquid and inorganic salt, wherein one of the phases consists mainly of ionic liquid and water, while the other consists of inorganic salt and water. The principle underlying the formation of these systems lies in the fact of associating two charged species (ionic liquid and inorganic salt), one being cosmotropic, the other chaotropic, or, in other words, an inorganic salt containing ions. with high hydration-free enthalpy, preferably multivalent ions, and an ionic liquid having a low solvation-free enthalpy, with bulky ions, alkyl chains and/or weakly hydrophilic anions. These systems have so far been mainly developed with a water with a neutral to slightly basic pH (pH<10). They are used for the extraction of organic molecules (food dyes, pharmaceuticals, organic molecules), and more rarely, for the extraction of metal ions: Onghena et al. (Chem Comm 2015, 51, 15932-15935) reports the use of a biphasic aqueous tributyl (tetradecyl) phosphonium chloride system ($[P_{44414}][Cl]$)/NaCl for the separation of cobalt ion and nickel ion.

Few biphasic aqueous systems with an acidic aqueous phase have been described so far. However, metal ions are generally soluble in acidic aqueous solutions and poorly soluble in neutral or basic aqueous solution. Aqueous biphasic systems comprising an aqueous acidic phase are therefore particularly sought after.

Ghosh et al. (J. Radioanal. Nucl. Chem., 2014, 302, 925-930) describe the use of a biphasic aqueous system of 1-butyl-3-methylimidazolium chloride [BMIM][Cl]/ $K_2HPO_4$ to extract silver ions. The separation is carried out in a nitric acid medium to avoid precipitating the metals. In this biphasic aqueous system, nitric acid is a spectator salt that does not contribute to phase separation. The medium is quite complex in that many anions are present ($Cl^-$, $NO_3^-$, $HPO_4^-$), and in that the $K^+$ cation is supernumerary, which generates the risk of having a parasitic extraction of this ion.

In addition, Onghena et al. (Ind. Eng. Chem.; 2015, 54, 1887-1898) describe the use of a biphasic aqueous bipyretic bis(trifluoromethylsulfonyl) imide betainium [Hbet][$NTf_2$]/ NaCl system at different pH. The high viscosity of [Hbet] [$NTf_2$] is detrimental to phase separation, which requires one hour. The use of this ionic liquid is complicated in that its hygroscopic character requires presaturation with water before use. In addition, the system does not allow efficient extractions at pHs below 1.5.

Alternative inexpensive compositions comprising an acidic aqueous solution that allows extraction and/or simple and effective separation of metal ions is therefore sought.

For this purpose, according to a first object, the invention relates to a composition comprising:

an ionic liquid of formula $C^+,(Xp-)_{1/p}$, in which:
  $C^+$ is an onium cation comprising at least one atom selected from N, S, P or O, wherein the onium cation comprises at least one hydrocarbon chain $R^1$ comprising from 6 to 20 carbon atoms, optionally interrupted by one or more groups selected from among —S—, —O—, —(C=O)—O—, —O—(C=O)—, —NR10-(C=O)—, —(C=O)—$NR^{11}$— or —$NR^{12}R^{13}$—, and/or optionally substituted with one or more groups selected from halogen, —$OR^{14}$, —(C=O)$R^{15}$, —(C=O)$NR^{16}R^{17}$—, —$NR^{18}R^{19}R^{20}$, —S—$R^{21}$, —(C=O)—$OR^{22}$, wherein $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$ and $R^{22}$ independently represent H or a linear or branched hydrocarbon chain comprising from 1 to 6 carbon atoms,
  $X^{p-}$ is an anion of charge p,
wherein the ionic liquid has a solubility in water at 20° C. of at least 10 g/L,
an acid, and
some water.
wherein the composition comprises two liquid phases:
a phase enriched in ionic liquid $\varphi_{IL}$ and
a phase enriched in water $\varphi_W$, whose pH is less than or equal to 4.7.

The invention is based on the discovery that a biphasic aqueous system comprising an acidic aqueous phase may be obtained:
  by using inexpensive and hydrophilic ionic liquids (solubility in water at 20° C. of at least 10 g/L), and
  without it being necessary to use a complex mixture of ions (complex mixture of salts and/or acids) to obtain good phase separation.

The composition according to the invention corresponds to a "biphasic aqueous liquid ionic/hydrophilic/inorganic salt system" in which the role of the organic salt is played by the acid. The composition according to the invention is a biphasic ionic-acidic aqueous system. It necessarily comprises two liquid phases $\varphi_{IL}$ and $\varphi_W$.

The fact that a composition comprising an acid, an ionic liquid and water, also comprises one or two liquid phases, depends on the nature and concentrations of the ionic liquid and the acid, the water concentration, and the temperature.

At a given temperature, the biphasic system is formed as soon as the concentrations of acid and ionic liquid are sufficient.

A composition comprising a given ionic liquid, a given acid, specific proportions of water, ionic liquid and acid, may be monophasic at certain temperatures and biphasic at other temperatures. The behavior of the composition may be of a lower critical solution temperature (LCST) type, i.e. that the composition is biphasic at temperatures above a certain temperature. Alternatively, the behavior of the composition may be of an upper critical solution temperature (UCST) solubility) type, i.e. that the composition is biphasic for temperatures below a certain temperature. Also, according to the alternative, raising or lowering the temperature promotes phase separation.

Generally, the composition according to the invention comprises two liquid phases $\varphi_{IL}$ and $\varphi_W$ at at least a temperature of between 0 and 100° C. In a first case, a composition comprising a given ionic liquid, a given acid, specific proportions of water, ionic liquid and acid may be biphasic at any temperature between 0 and 100° C. According to a second case, it may be monophasic between 0° C. and a given temperature $T_1$ and biphasic between the temperature $T_1$ and 100° C. (LCST). According to a third alternative, it may be biphasic between 0° C. and a given temperature $T_2$ and monophasic between the temperature $T_2$ and 100° C. (UCST). According to a fourth case, it may be monophasic between 0° C. and a given temperature $T_3$, biphasic between $T_3$ and a given temperature $T_4$ that is higher than $T_3$ and monophasic between the temperature $T_4$ and 100° C. The present case depends on the natures of the ionic liquid and the acid, their concentrations, and the concentration of water. Those skilled in the art know how to determine without difficulty and using a phase diagram whether a composition is biphasic at at least a temperature of between 0 and 100° C., and in what case defined above is the composition. It is therefore easy to prepare the composition according to the invention by mixing water, an acid and an ionic liquid in various proportions, preferably with the aid of a phase diagram.

The composition according to the invention comprises two liquid phases $\varphi_{IL}$ and $\varphi_W$. Each of these phases comprises water, acid and ionic liquid. However, the liquid phase $\varphi_{IL}$ is enriched in ionic liquid, whereas the liquid phase $\varphi_W$ is, by comparison, poor in ionic liquid and enriched in water. In other words, the molar proportion of ionic liquid $[C^+, (X^{p-})_{1/p}]\varphi_{IL}$ in the liquid phase $\varphi_{IL}$ is greater than the molar proportion of ionic liquid $[C^+, (X^{p-})_{1/p}]\varphi_W$ in the liquid phase $\varphi_W$, while the molar proportion of water $[H_2O]\varphi_{IL}$ in the liquid phase $\varphi_{IL}$ is less than the molar proportion of water $[H_2O]\varphi_W$ in the liquid phase $\varphi_W$.

The two liquid phases $\varphi_{IL}$ and $\varphi_W$ are visible to the naked eye. Typically, it is estimated that a composition comprises two liquid phases $\varphi_{IL}$ and $\varphi_W$ when its nephelometric turbidity unit (NTU) measured by nephelometry is greater than 30, preferably 50, when the composition is stirred, for example at 50 rpm.

The composition according to the invention comprises an ionic liquid of formula $[C^+,(X^{p-})_{1/p}]$.

$C^+$ is an onium cation comprising at least one atom chosen from among N, S, P or O, preferably chosen from among:
ammonium, phosphonium, sulphonium and
the cations of a saturated, unsaturated or aromatic heterocycle comprising from 4 to 9 atoms, of which at least one heteroatom is chosen from among N, S or O,
wherein the onium cation comprises at least one hydrocarbon chain $R^1$ as defined above.

The cation of such a heterocycle is, in particular, a pyridinium, a pyrrolidinium, a pyrazolium, an imidazolium, a thiazolium or an ixazolium, preferably a pyridinium, an imidazolium or a thiazolium.

The ionic liquid has one of the following formulas:

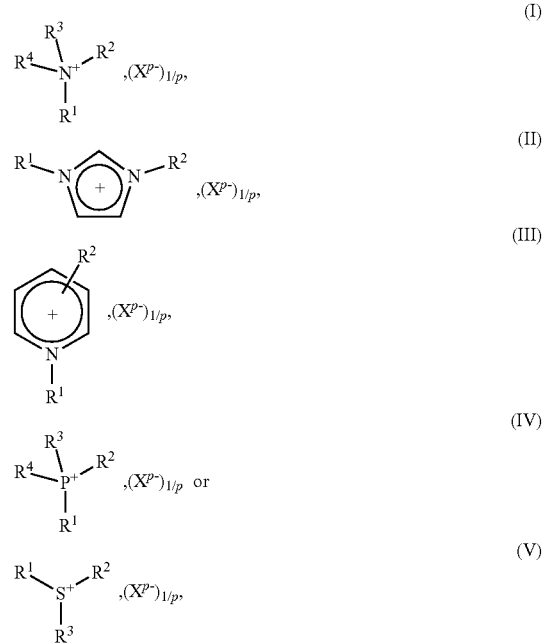

in which:
$R^1$ is as defined above,
$R^2$, $R^3$ and $R^4$ independently represent a hydrocarbon chain comprising from 1 to 20 carbon atoms, optionally interrupted by one or more groups chosen from —S—, —O—, —(C=O)—O—, —O—(C=O)—, —NR$^{110}$—(C=O)—, —(C=O)—NR$^{111}$— or —NR$^{112}$R$^{113}$—, and/or optionally substituted by one or more groups chosen from a halogen, —OR$^{114}$, —(C=O)R$^{115}$, —(C=O)NR$^{116}$R$^{117}$—, —NR$^{118}$R$^{119}$R$^{120}$, —S—R$^{121}$, (C=O)—OR$^{122}$, wherein R$^{110}$, R$^{111}$, R$^{112}$, R$^{113}$, R$^{114}$, R$^{115}$, R$^{116}$, R$^{117}$, R$^{118}$, R$^{119}$, R$^{120}$, R$^{121}$ and R$^{122}$ independently represent H or a linear or branched hydrocarbon chain comprising from 1 to 6 carbon atoms, wherein two groups selected from R$^1$, R$^2$, R$^3$ and R$^4$ may be connected to form a ring,
$X^{p-}$ is an anion of charge p.

Generally, the R$^1$ chain of the onium cation, in particular the onium cation of the formulas (I) to (V) above, represents: an alkyl, an alkenyl, an alkynyl, wherein the alkyl, alkenyl and alkynyl comprise from 6 to 20 carbon atoms and are linear, branched or cyclic, being optionally interrupted by one or more groups chosen from —S—, —O—, —(C=O)—O—, —O—(C=O)—, —NR$^{10}$—(C=O)—, —(C=O)—NR$^{11}$— or —NR$^{12}$R$^{13}$—, and/or optionally substituted with one or more groups selected from a halogen, —OR$^{14}$, —(C=O)R$^{15}$, —(C=O)R$^{16}$R$^{17}$—, —NR$^{18}$R$^{19}$R$^{20}$, —S—R$^{21}$, —(C=O)—OR$^{22}$, where R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$ and R$^{22}$ are as defined above, or an aryl comprising from 6 to 20 carbon atoms, wherein the aryl optionally comprises one or more atoms chosen from —S—, —O—, and —NR$^{12}$R$^{13}$—, and/or the aryl is optionally substituted by one or more groups chosen from halogen, —OR$^{14}$, —(C=O)R$^{15}$, —(C=O)NR$^{16}$R$^{17}$—, —R$^{18}$R$^{19}$R$^{20}$, —S—R$^{21}$, —(C=O)—OR$^{22}$, wherein R$^{12}$, R$^{13}$, R$^{14}$, R$^{15}$, R$^{16}$, R$^{17}$, R$^{18}$, R$^{19}$, R$^{20}$, R$^{21}$ and R$^{22}$ are as defined above.

Preferably, the $R^1$ chain of the onium cation, in particular the onium cation of formulas (I) to (V) above, represents:
- a linear, branched or cyclic alkyl comprising from 6 to 20 carbon atoms,
- a linear, branched or cyclic alkoxyl containing from 6 to 20 carbon atoms, or a group of formula $-[(CH_2)_2-O]_x-R^{150}$, where x represents an integer of 3 to 10 and $R^{150}$ represents H or a linear or branched hydrocarbon-based chain containing from 1 to 6 carbon atoms, preferably a methyl,
- a group of formula $-[(CH_2)_3-O]_y-R^{151}$, where y represents an integer from 2 to 6 and $R^{151}$ represents H or a linear or branched hydrocarbon-based chain containing from 1 to 6 carbon atoms, preferably a methyl.

Preferably, the chain $R^1$ comprises at least 8, in particular at least 10, typically at least 12, for example at least 14 carbon atoms.

$R^{22}$ generally represents a linear or branched hydrocarbon chain comprising from 1 to 6 carbon atoms.

Preferably, the cation $C^+$ comprises, in addition to the hydrocarbon chain $R^1$ defined above, a hydrocarbon chain $R^2$ comprising from 2 to 20 carbon atoms, in particular from 4 to 20 carbon atoms optionally interrupted by one or more groups chosen from among $-S-$, $-O-$, $-(C=O)-O-$, $-O-(C=O)-$, $-NR^{210}-(C=O)-$, $-(C=O)-NR^{211}-$ or $-NR^{212}R^{213}-$, and/or optionally substituted by one or more groups selected from halogen, $-OR^{214}$, $-(C=O)R^{215}$, $-(C=O)NR^{216}R^{217}-$, $-NR^{218}R^{219}R^{220}$, $-S-R^{221}$, $(C=O)-OR^{222}$, wherein $R^{210}$, $R^{211}$, $R^{212}$, $R^{213}$, $R^{214}$, $R^{215}$, $R^{216}$, $R^{217}$, $R^{218}$, $R^{219}$, $R^{220}$, $R^{221}$ and $R^{222}$ independently represent H or a linear or branched hydrocarbon chain comprising from 1 to 6 carbon atoms, wherein the groups $R^1$ and $R^2$ may be connected to form a ring. This cation typically has one of the formulas (I), (II), (III), (IV) or (V) as defined above.

The $C^+$ cation may comprise, in addition to the hydrocarbon chain $R^1$ and the hydrocarbon chain $R^2$ defined above, a hydrocarbon chain $R^3$ comprising from 2 to 20 carbon atoms, especially from 4 to 20 carbon atoms, optionally interrupted by one or more groups selected from among $-S-$, $-O-$, $-(C=O)-O-$, $-O-(C=O)-$, $-NR^{310}-(C=O)-$, $-(C=O)-NR^{311}-$ or $-NR^{312}R^{313}-$, and/or optionally substituted with one or more groups selected from among a halogen, $-OR^{314}$, $-(C=O)R^{315}$, $-(C=O)NR^{316}R^{317}-$, $-NR^{315}R^{319}R^{320}$, $-S-R^{321}$, $-(C=O)-OR^{322}$, wherein $R^{310}$, $R^{311}$, $R^{312}$, $R^{313}$, $R^{314}$, $R^{315}$, $R^{316}$, $R^{317}$, $R^{318}$, $R^{319}$, $R^{320}$, $R^{321}$ and $R^{322}$ independently represent H or a linear or branched hydrocarbon chain comprising from 1 to 6 carbon atoms, wherein two groups selected from $R^1$, $R^2$ and $R^3$ may be connected to form a ring. This cation typically has one of the formulas (I), (IV) or (V) as defined above.

Preferably, $R^2$, $R^3$ and $R^4$ independently represent:
- a linear, branched or cyclic alkyl comprising from 2 to 20 carbon atoms,
- a linear, branched or cyclic alkoxyl containing from 2 to 20 carbon atoms, or a group of formula $[(CH_2)_2-O]_{x'}-R^{150}$, wherein x' represents an integer from 1 to 10 and $R^{150}$ represents H or a linear or branched hydrocarbon chain containing from 1 to 6 carbon atoms, preferably a methyl,
- a group of formula $[(CH_2)_3-O]_{y'}-R^{151}$, wherein y' represents an integer from 1 to 6 and $R^{151}$ represents H or a linear or branched hydrocarbon chain containing from 1 to 6 carbon atoms, preferably methyl.

Among the preferred ionic liquids, mention may be made of those of the following formulas (X), (XI), (XII), (XIII) or (XIV):

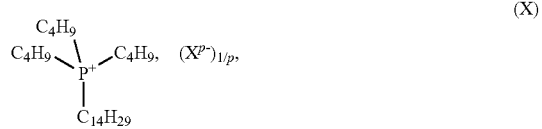

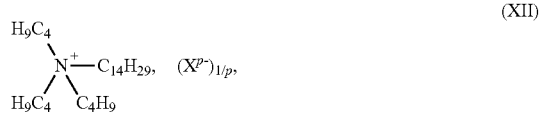

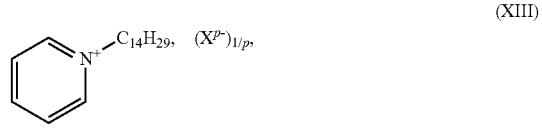

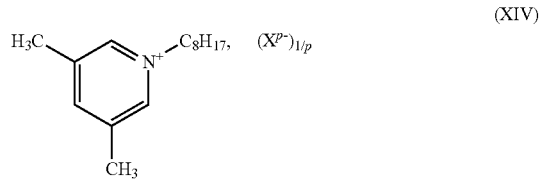

in which $X^{p-}$ is an anion of charge p.

Preferably, in the composition according to the invention, the $C^+$ cation does not comprise a negative charge. It is not a zwitterion.

The anion $X^{p-}$ is chosen especially from among the anions $BF_4^-$, $PF_6^-$, $CF_3SO_3^-$, $HSO_4^-$, $SO_4^{2-}$, $NO_3^-$, $CH_3COO^-$, $CF_3CO_2^-$, $ClO_4^-$, $HPO_4^{2-}$, $H_2PO_4^-$, the halides (such as $Cl^-$, $Br^-$, $I^-$ or $F^-$), the anions $BR^5_4^-$, $RCO_2^-$ or $R^5SO_3^+$, wherein $X^{p-}$ is a linear or branched alkyl group comprising 1 to 4 carbon atoms, preferably a methyl. Preferably, $X^{p-}$ is selected from halide anions, $HSO_4^-$, $SO_4^{2-}$, $NO_3^-$, $MeSO_3^-$. These anions are therefore "simple", inexpensive, and not very toxic, unlike perfluorinated hydrophobic anions that are usually used to prepare ionic liquids immiscible in water. In addition, the ionic liquids comprising these "simple" anions are generally much less viscous than those prepared from perfluorinated hydrophobic anion. They are therefore easier to handle.

Preferably, in the composition according to the invention, the anion $X^{p-}$ does not comprise a positive charge. It is not a zwitterion.

The ionic liquid has a solubility in water at 20° C. of at least 10 g/L, preferably at least 20 g/L. The water used to measure this solubility is typically distilled water, for example milli-Q™ water. For example, the ionic liquid of formula (XI) above is soluble at 20° C. in any proportion. Those skilled in the art may very easily select ionic liquids having such solubilities in water.

Generally, the proportion of ionic liquid is 10 to 90% by weight in the composition.

The composition according to the invention comprises an acid. This acid allows the water-enriched phase $\varphi_W$ to have a pH less than or equal to 4.7. The pH of the water-enriched phase $\varphi_W$ is in particular less than 4.0, typically less than 3.0, or even less than 2.0, preferably less than 1.5, particularly preferably less than 1.0, for example less than 0.5, especially less than 0.2.

Generally, the acid is an acid of which at least one of the pKa is less than or equal to 4.7. When an acid has a single pKa, it is less than or equal to 4.7. When an acid has several pKa, it suffices that one of them is less than or equal to 4.7. The pKa is that measured in water at 25° C.

The acid may be organic, inorganic or a mixture thereof.

Among the organic acids, mention may be made of formic acid (pKa=3.8), acetic acid (pKa=4.7), oxalic acid (pKa=1.2) and lactic acid (pKa=3.9), uric acid (pKa=−1.1), p-toluenesulfonic acid (pKa=−2.8), trifluoromethanesulfonic acid (pKa=−12).

Among the inorganic acids, mention may be made of hydrochloric acid, sulfuric acid, nitric acid, phosphoric acid or perchloric acid.

Preferably, the acid has the formula $H_p(X^{p-})$, where $X^{p-}$ is the anion of the ionic liquid of the composition. The separation of the phases $\varphi_{IL}$ and $\varphi_W$ is then generally facilitated. For example:
- the acid is hydrochloric acid and $X^{p-}$ represents $Cl^-$,
- the acid is sulfuric acid and $X^{p-}$ represents $HSO_4^-$ and/or $SO_4^{2-}$,
- the acid is nitric acid and $X^{p-}$ represents $NO_3^-$,
- the acid is phosphoric acid and $X^{p-}$ represents $H_2PO_4^-$, $HPO_4^{2-}$ or $PO_4^{3-}$, or
- the acid is trifluoromethanesulphonic acid, and $X^{p-}$ represents $CF_3SO_3^-$.

Preferably, the composition according to the invention comprises only one acid. In fact, it is not necessary to add a second acid to cause the phases $\varphi_{IL}$ and $\varphi_W$ to separate.

Generally, the concentration of acid in the composition is greater than or equal to 0.1 mol/l, especially greater than or equal to 1.5 mol/l, preferably greater than or equal to 1.0 mol/l.

The composition does not generally comprise additional ionic compounds to the ionic liquid, the acid and the metal ion salts (optionally in the form of complexes). In particular, the addition of additional ionic compounds is not necessary to cause the phases $\varphi_{IL}$ and $\varphi_W$ to separate. The composition according to the invention is therefore simple and inexpensive.

The composition according to the invention comprises water.

The composition generally comprises less than 5% by weight of organic solvent. It is preferably free of it.

The composition generally comprises less than 5% by weight of extracting agent (cyanide salt, ammonium, cyanex, crown ether, tributyl phosphate, for example). It is preferably free of it.

Generally, the cumulative proportions of the ionic liquid, water and acid are greater than 70% by weight, especially greater than 80% by weight, typically greater than 90% by weight, or even greater than 95% by weight, sometimes even greater than 99% by weight relative to the total weight of the composition.

The composition according to the invention is particularly useful for extracting a metal ion from an acidic aqueous medium comprising a metal ion, for separating metal ions from an aqueous medium comprising at least two metal ions, or for purifying an aqueous acidic solution comprising a metal ion.

For the purposes of the application, the term "metal ion" is intended to mean both the metal ion in free form (for example $Co^{2+}$), the metal ion in the form of a complex with other ions (for example $[Co(II)Cl_4]^{2-}$), the metal ion in hydrated form or not (for example $[Co(H_2O)_5]^{2+}$), or in complexed and hydrated form. In the methods described below, the metal ion may be in one form at a certain stage and in another form at another stage.

The metal ions are generally soluble in acidic aqueous solutions. Advantageously, the composition according to the invention makes it possible to extract one or more metal ions in the liquid phase enriched in $\varphi_{IL}$ ionic liquid.

The use of the composition according to the invention advantageously makes it possible to avoid the use of organic solvents such as kerosene.

The metal ion (M, $M_1$ or $M_2$ below) is preferably a metal ion capable of forming a negatively charged complex in the acidic aqueous phase $\varphi W$. It is generally chosen from the ions of precious metals (gold, silver, platinum, rhodium and palladium), platinoids, refractory metals and rare earths.

Also, according to a second object, the invention relates to a method for extracting a metal ion M from a medium, comprising the steps of:
a) contacting an ionic liquid as defined above with an aqueous medium comprising a metal ion M and an acid as defined above, wherein a composition is obtained at a temperature Ti, and wherein the composition comprises:
   either a single liquid phase,
   or two liquid phases $\varphi_{IL}$ and $\varphi_W$ (it is then a composition according to the invention), provided that, at the temperature $T_i$, the partition coefficient of the metal ion between the two phases $\varphi_{IL}$ and $\varphi_W$:

$K(M)_{Ti}=[M]\varphi_{IL}/[M]\varphi_W$ in which $[M]\varphi_{IL}$ is the concentration of M in the phase $\varphi_{IL}$ at the temperature $T_i$ and $[M]\varphi_W$ is the concentration of M in the phase $\varphi_W$ at the temperature $T_i$, is greater than 1, preferably greater than 1.1, in particular, greater than 2, even greater than 5, especially greater than 10, typically greater than 100, b) when a composition comprising a single liquid phase is obtained in step a), varying the temperature to obtain a composition according to the invention at a temperature $T_f$ different from $T_i$ comprising two liquid phases $\varphi_{IL}$ and $\varphi_W$, provided that at the temperature $T_f$ the partition coefficient of the metal ion between the two phases $\varphi_{IL}$ and $\varphi_W$:

$K(M)_{Tf}=[M]\varphi_{IL}/[M]\varphi_W$ in which $[M]\varphi_{IL}$ is the concentration in M in the phase $\varphi_{IL}$ at the temperature $T_f$ and $[M]\varphi_W$ is the concentration in M in the phase $\varphi_W$ at the temperature $T_f$ is greater than 1, preferably greater than 1.1, especially greater than 2, even greater than 5, especially greater than 10, typically greater than 100, d) separating the phases $\varphi_{IL}$ and $\varphi_W$ of the composition according to the invention obtained in step a) or b), then e) optionally extracting the metal ion M from the phase $\varphi_{IL}$.

The method is step-free b) when a composition comprising two liquid phases $\varphi_{IL}$ and $\varphi_W$ is obtained at the end of step a).

During step a) or b), the metal ion M is extracted in the $\varphi_{IL}$ phase.

The aqueous medium of step a) is generally an aqueous solution.

It is advantageous for step a) to lead to a composition comprising only a single liquid phase (monophasic composition), in particular by choosing the temperature $T_i$ in this sense. In fact, the thermotropic behavior of the composition (variation of the formation of two phases as a function of temperature) allows a rapid formation of the two phases during step b) and an immediate extraction of the metal ion during step b). When the composition is of the LCST type, it is necessary to increase the temperature to induce phase separation and $T_f$ is greater than $T_i$. When the composition is of the UCST type, it is necessary to reduce the temperature to induce the phase separation and $T_f$ is lower than $T_i$.

When step a) leads to a composition comprising two liquid phases $\varphi_{IL}$ and $\varphi_W$, it may be necessary to stir the two phases in order to obtain a good extraction of the metal ion M.

Of course, steps a), b) and c) may be repeated one or more times, which allows for several separation cycles. In this case, the $\varphi_W$ phase obtained at the end of step c) may serve as an aqueous medium in step a) which is repeated.

The extraction process according to the invention may make it possible to recycle the metal ion.

The method may comprise, before step a), a step $a_0$) to prepare the aqueous medium comprising a metal ion M and an acid, typically by contacting an acidic aqueous solution with a medium comprising a metal ion M. This medium comprising a metal ion M may be an ore, a residue obtained after a chemical reaction or an electrolyte.... Step $a_0$) may be, for example, a leaching. The aqueous medium used in step a) is typically an acid leachate solution, as used in conventional hydrometallurgical processes. The extraction method according to the invention may be implemented in the context of a hydrometallurgical method.

By way of example, in the extraction method defined above, the ionic liquid has the formula (IV), preferably the formula (XI), the acid is HCl, and the metal ion M is Fe(III), Co(II) or Pt(IV).

The extraction yield of the extraction process according to the invention is advantageously extremely high, and generally higher than the usual yields obtained by carrying out extractions with organic solvents and extraction agents.

According to one embodiment, the aqueous medium comprising a metal ion M and an acid used in step a) comprises at least two different metal ions $M_1$ and $M_2$. The method may then be a method for separating the metal ions $M_1$ and $M_2$. According to a first alternative, the method is a method for separating metal ions $M_1$ and $M_2$ comprising the steps of:

a') contacting an ionic liquid as defined above with an aqueous medium comprising two metal ions $M_1$ and $M_2$ (of different natures) and an acid as defined above, wherein a composition is obtained at a temperature $T_i$, and the composition comprises:
either a single liquid phase,
or two liquid phases $\varphi_{IL}$ and $\varphi_W$, provided that, at the temperature $T_i$, the separation factor $\beta(M_1/M_2)_{Ti}$, corresponds to the ratio between the partition coefficients of $M_1$ and $M_2$ $$\beta(M_1/M_2)_{Ti} = K(M_1)_{Ti}/K(M_2)_{Ti} = ([M_1]\varphi_{IL}/[M_1]\varphi_W)/([M_1]\varphi_{IL}/[M_1]\varphi_W)$$

in which:
$K(M_2)_{Ti}$ is the partition coefficient at the temperature $T_i$ of the metal ion $M_1$ between the two phases $\varphi_{IL}$ and $\varphi_W$, with $K(M_1)_{Ti} = [M]\varphi_{IL}/[M_1]\varphi_W$,
$K(M_2)_{Ti}$ is the partition coefficient at the temperature $T_i$ of the metal ion $M_2$ between the two phases $\varphi_{IL}$ and $\varphi_W$, with $K(M_2)_{Ti} = [M_2]\varphi_{IL}/[M_2]\varphi_W$,
$[M_1]_{\varphi IL}$ is the concentration in $M_1$ in the phase $\varphi_{IL}$ at the temperature $T_i$ and $[M_1]\varphi_W$ is the concentration in $M_1$ in the phase $\varphi_W$ at the temperature
$[M_2]_{\varphi IL}$ is the concentration in $M_2$ in the phase $\varphi_{IL}$ at the temperature $T_i$ and $[M_2]\varphi_W$ is the concentration in $M_2$ in the phase $\varphi_W$ at the temperature $T_i$, is greater than 1, preferably greater than 1.1, especially greater than 2, or even greater than 5, especially greater than 10, typically greater than 100.

b') when a composition comprising a single liquid phase is obtained in step a'), varying the temperature to obtain a composition according to the invention at a temperature $T_f$ different from $T_i$ comprising two liquid phases $\varphi_{IL}$ and $\varphi_W$, under reserves that, at the temperature $T_f$, the separation factor $b(M_1/M_2)_{Tf}$ corresponding to the ratio between the partition coefficients of $M_1$ and $M_2$ $$b(M_1/M_2)_{Tf} = K(M_1)_{Tf}/K(M_2)_{Tf} = ([M_1]\varphi_{IL}/[M_1]\varphi_W)/([M_1]\varphi_{IL}/[M_1]\varphi_W)$$

in which:
$K(M_1)_{Tf}$ is the partition coefficient at the temperature $T_f$ of the metal ion $M_1$ between the two phases $\varphi_{IL}$ and $\varphi_W$, with $K(M_1)_{Tf} = [M_1]\varphi_{IL}/[M_1]\varphi_W$,
$K(M_2)_{Tf}$ is the partition coefficient at the temperature $T_f$ of the metal ion $M_2$ between the two phases $\varphi_{IL}$ and $\varphi_W$, with $K(M_2)_{Tf} = [M_2]\varphi_{IL}/[M_2]\varphi_W$
$[M_1]_{\varphi IL}$ is the concentration in $M_1$ in the phase $\varphi_{IL}$ at the temperature $T_f$ and $[M_2]\varphi_W$ is the concentration in $M_1$ in the phase $\varphi_W$ at the temperature $T_f$,
$[M_2]_{\varphi IL}$ is the concentration in $M_2$ in the phase $\varphi_{IL}$ at the temperature $T_f$ and $[M_2]\varphi_W$ is the concentration in $M_2$ in the phase $\varphi_W$ at the temperature $T_f$, is greater than 1, preferably greater than 1.1, especially greater than 2, even greater than 5, especially greater than 10, typically greater than 100, c') separating the phases $\varphi_{IL}$ and $\varphi_W$ of the composition according to the invention obtained in step a') or b'), then d) optionally extracting the metal ion $M_1$ from the phase $\varphi_{IL}$, e') optionally extracting the metal ion $M_2$ from the phase $\varphi_W$.

This embodiment advantageously makes it possible to separate at least two metal ions $M_1$ and $M_2$. During step a') or b'), the metal ion $M_1$ is extracted in the phase $\varphi_{IL}$ while the metal ion $M_2$ remains in the phase $\varphi_W$.

By way of example, in the extraction method according to the first alternative defined above, the ionic liquid has the formula (IV), preferably the formula (XI), the acid is HCl, and the metal ion $M_1$ is Co(II) and the metal ion $M_2$ is Ni(II). Cobalt and nickel are two neighboring metals in the periodic table. In addition, they are often associated both in the ores that produce these metals in the devices to recycle. Methods able to separate them easily are therefore sought.

Of course, steps a'), b') and c') may be repeated one or more times, which allows for several separation cycles. In this case, the phase $\varphi_W$ obtained at the end of step c') serves as an aqueous medium in step a') which is repeated.

According to a second alternative, the method is a method for separating metal ions $M_1$ and $M_2$ comprising the steps of:

a") contacting an ionic liquid as defined above with an aqueous medium comprising an acid as defined above and two metal ions $M_1$ and $M_2$ (of different natures), wherein a composition with a temperature $T_i$, and wherein the composition comprises:
either a single liquid phase,
or two liquid phases $\varphi_{IL}$ and $\varphi_W$, provided that, at the temperature $T_i$:
the partition coefficient of the metal ion $M_1$ between the two phases $\varphi_{IL}$ and $\varphi_W$:

$K(M_1)_{Ti} = [M_1]\varphi_{IL}/[M_1]\varphi_W$ is greater than 1, preferably greater than 1.1, especially greater than 2, even greater than 5, especially greater than 10, typically greater than 100, the partition coefficient of the metal ion $M_2$ between the two phases $\varphi_{IL}$ and $\varphi_W$:

$$K(M_1)_{Tf}=[M_1]\varphi_{IL}/[M_1]\varphi_W$$

is greater than 1, preferably greater than 1.1, especially greater than 2, even greater than 5, especially greater than 10, typically greater than 100, b") when a composition comprising a single liquid phase is obtained in step a"), varying the temperature to obtain a composition according to the invention at a temperature $T_f$ different from $T_i$ comprising two liquid phases $\varphi_{IL}$ and $\varphi_W$, provided that at temperature $T_f$:
the partition coefficient of the metal ion $M_1$ between the two phases $\varphi_{IL}$ and $\varphi_W$:

$$K(M_1)_{Tf}=[M_1]\varphi_{IL}/[M_1]\varphi_W$$

is greater than 1, preferably greater than 1.1, especially greater than 2, even greater than 5, especially greater than 10, typically greater than 100,
the partition coefficient of the metal ion $M_2$ between the two phases $\varphi_{IL}$ and $\varphi_W$:

$$K(M_2)_{Tf}=[M_2]\varphi_{IL}/[M_2]\varphi_W$$

is greater than 1, preferably greater than 1.1, especially greater than 2, even greater than 5, especially greater than 10, typically greater than 100, c") separating the phases $\varphi_{IL}$ and $\varphi_W$ of the composition according to the invention obtained in step a") or b"), then d") contacting, at a temperature $T_\Omega$, the $\varphi_{IL}$ phase with an aqueous solution such that:
the solubility in the aqueous solution at the temperature $T_\Omega$ of $M_1$ is greater than or equal to 0.01 mol/l,
the solubility in the aqueous solution at the temperature $T_\Omega$ of $M_2$ is less than or equal to 0.001 mol/l,
wherein $M_2$ precipitates and a medium $\Omega$ comprising a solid comprising $M_2$ and at least one liquid phase comprising $M_1$ is obtained, e") optionally filtering the medium $\Omega$ to recover the solid comprising $M_2$, f") optionally extracting the metal ion $M_1$ from the liquid phase. The medium $\Omega$ may comprise one or two liquid phases.

During step a") or b"), the metal ions $M_1$ and $M_2$ are extracted in the phase $\varphi_{IL}$. It is the addition of the aqueous phase during step d") which makes it possible to separate the two metal ions, since the metal ion $M_1$ remains in the liquid phase (mixture of ionic liquid, aqueous phase and the metal ion $M_1$) while the metal ion $M_2$ precipitates. The separation is therefore induced taking into account differences in the solubilities of $M_1$ and $M_2$ in the aqueous solution introduced in step d").

Of course, the steps a"), b") and c") may be repeated one or more times, which allows for several separation cycles. In this case, the $\varphi_W$ phase obtained at the end of step c") serves as an aqueous medium in step a") which is repeated.

By way of example, in the extraction method according to the second alternative defined above, the ionic liquid has the formula (IV), preferably the formula (XI), the acid is HCl, and the metal ion $M_1$ is Co(II), and the metal ion $M_2$ is Pt(IV). Typically, the aqueous medium comprising an acid used in step a") is an aqueous solution of pH less than −0.5, for example an aqueous solution of 10M HCl (in which the Pt(IV) ions are soluble) and the aqueous solution implemented in step d) is an aqueous solution of pH greater than 0.5, for example an aqueous solution of 1M HCl (in which the Pt(IV) ions are not soluble).

According to a third object, the invention relates to a method for purifying an acidic aqueous solution comprising a metal ion M comprising the steps of:

i) contacting an ionic liquid as defined above with an aqueous solution S comprising a metal ion M at a $[M]_S$ concentration and an acid as defined above, wherein a composition at a concentration of temperature $T_i$ is obtained, and wherein the composition comprises:
either a single liquid phase,
or two liquid phases $\varphi_{IL}$ and $\varphi_W$, provided that, at the temperature $T_i$, the partition coefficient of the metal ion between the two phases $\varphi_{IL}$ and $\varphi_W$:

$$K(M)_{Ti}=[M]\varphi_{IL}/[M]\varphi_W$$

is greater than 1, preferably greater than 1.1, especially greater than 2, even greater than 5, especially greater than 10, typically greater than 100, ii) when a composition comprising a single liquid phase is obtained in step i), varying the temperature to obtain a composition according to the invention at a temperature $T_f$ different from $T_i$ comprising two liquid phases $\varphi_{IL}$ and $\varphi_W$, provided that at the temperature $T_f$, the partition coefficient of the metal ion between the two phases $\varphi_{IL}$ and $\varphi_W$:

$$K(M)_{Tf}=[M]\varphi_{IL}/[M]\varphi_W$$

is greater than 1, preferably greater than 1.1, especially greater than 2, even greater than 5, especially greater than 10, typically greater than 100, iii) separating the phases $\varphi_{IL}$ and $\varphi_W$ of the composition according to the invention obtained in step i) or ii), wherein a phase $\varphi_W$ is obtained which is an acidic aqueous solution whose concentration of metal ion M $[M]\varphi_W$ is less than the concentration $[M]_S$.

Of course, steps i), ii) and iii) may be repeated one or more times, which allows for several separation cycles. In this case, the $\varphi_W$ phase obtained at the end of step iii) serves as aqueous solution S in step i) which is repeated.

This method may be used to recycle the acidic aqueous solution.

The method may comprise, after step iii), a step iv) of extracting the metal ion M from the $\varphi_{IL}$ phase.

The steps of extraction of the metal ion d), d'), e'), f") and iv) defined above may be, for example, implemented:
by release of the metal ion in another phase,
by precipitation of the metal ion, wherein this precipitation is capable of being induced by a complexing agent for the metal ion to be extracted, for example oxalic acid, or
by electrochemistry.

The invention is illustrated in light of the figures and examples which follow, given by way of illustration.

FIGURES

EXAMPLE 1: BIPHASIC SYSTEM [P$_{44414}$][Cl]—HCl—H$_2$O

Compositions comprising water, HCl and tributyltetradecylphosphonium chloride [P$_{44414}$][Cl] (Cytec Industries) were prepared by varying the mass concentrations of ionic liquid [P$_{44414}$][Cl] and HCl at four temperatures (24° C., 36° C., 45° C. and 56° C.). Depending on the proportions and the temperatures, a monophasic or biphasic medium was obtained.

Figure 1:
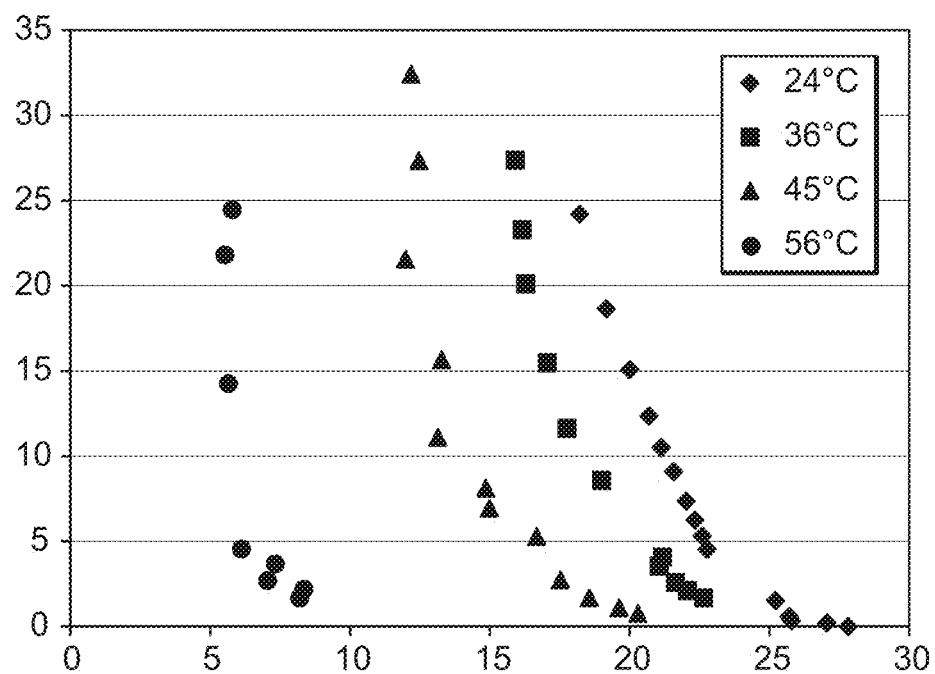
FIG. 1 shows a phase diagram formed by ionic liquid [$P_{44414}$][Cl] and HCl at four different temperatures, namely 24° C., 36° C., 45° C. and 56° C. For each temperature, the biphasic system/monophasic system transition is represented as a function of the [$P_{44414}$][Cl] mass concentration (ordinate) and the HCl mass concentration (abscissa).

FIG. 1 shows a phase diagram for each of the temperatures tested.

The system is biphasic when the prepared mixture corresponds to a point located in the right zone of the curve shown in FIG. 1. The system then corresponds to a composition according to the invention.

On the other hand, since the mixture prepared corresponds to a point situated in the zone to the left of the curve presented in FIG. 1, the system is monophasic (a homogeneous phase) and these systems are therefore not compositions according to the invention.

At 45° C., the biphasic system is formed at lower HCl concentrations than those required at 25° C. This is characteristic of an LCST type behavior.

EXAMPLE 2: USE OF A BIPHASIC SYSTEM [P$_{44414}$][Cl]—HCl—H$_2$O TO EXTRACT Fe(III) IONS

Iron has been used as an example of a metal whose presence in aqueous solution requires the use of acid to avoid the formation of iron hydroxide and the precipitation of the metal ion.

0.015 g of FeCl$_3$.6H$_2$O (supplied by Alfa Aesar) was dissolved in 50 mL at 10 M HCl (supplied by Roth). The solution was yellow. 1 ml of this solution was mixed with 0.25 g of [P$_{44414}$][Cl] (supplied by Cytec) at 25° C. A biphasic composition was obtained, comprising:
- a yellow upper phase: the phase enriched in ionic liquid $\varphi_{IL}$ comprising Fe(III), and
- an almost colorless lower phase: the phase enriched in water $\varphi_W$.

The partition coefficient of the Fe(III) metal ion between the two phases $\varphi_{IL}$ and $\varphi_W$ was $$K(Fe(III))_n = [Fe(III)]\varphi_{IL}/[Fe(III)]\varphi_W > 750$$

Fe(III) was quantitatively extracted with acidic ABS [P$_{44414}$][Cl]—HCl—H$_2$O. More than 99.7% of the Fe(III) is extracted from the acidic aqueous phase as measured by flame absorption spectroscopy.

EXAMPLE 3: USE OF A BIPHASIC SYSTEM [P$_{44414}$][Cl]—HCl—H$_2$O TO SEPARATE Ni AND Co IONS

In 50 mL of an 18 wt % HCl aqueous solution, 0.065 g of NiCl$_2$ and 0.12 g of CoCl$_2$.6H$_2$O (supplied by Alfa Aesar) were mixed at 25° C. In 1 mL of this solution, 0.25 g of [P$_{44414}$][Cl] was added. The mixture was monophasic at 25° C., blue in color. The mixture was heated to 50° C., which induced phase separation, namely:
- a blue upper phase: the phase enriched in $\varphi_{IL}$ ionic liquid comprising cobalt (II), and
- an almost colorless lower phase: the water-enriched phase $\varphi_W$ in which the nickel (II) remained.

Figure 2:
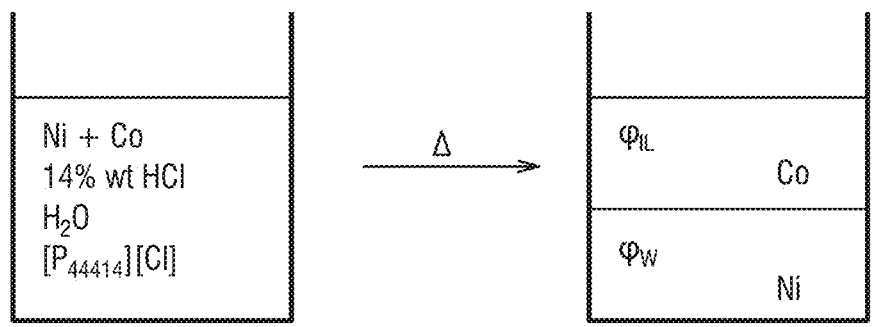
FIG. 2 shows a diagram of the protocol followed in Example 3.

The protocol followed is illustrated in FIG. 2. The analyzes were carried out by flame absorption spectroscopy.

The partition coefficient of the Co(II) metal ion between the two phases $\varphi_{IL}$ and $\varphi_W$ was $$K(Co(II))_n = [Co(II)]\varphi_{IL}/[Co(II)]\varphi_W = 190$$

The partition coefficient of the Fe(III) metal ion between the two phases $\varphi_{IL}$ and $\varphi_W$ was $$K(Ni(II))_n = [Ni(II)]\varphi_{IL}/[Ni(II)]\varphi_W = 0.14$$

A one-step and quantitative separation of cobalt and nickel was thus achieved, which is an advantage over the methods usually used in the prior art. The nickel-cobalt separation is not effective with conventional methods and requires several consecutive extraction steps to obtain a quantitative separation of the two metal ions.

EXAMPLE 4: USE OF A BIPHASIC SYSTEM [P$_{44414}$][Cl]—HCl—H$_2$O TO SEPARATE Pt AND Co IONS

Platinum is known as a noble metal which dissolves only in very acid aqueous solutions (typically in aqua regia: a mixture of hydrochloric acid and nitric acid concentrated in a proportion of 2 to 4 volumes of hydrochloric acid for 1 volume of nitric acid.

To 1 mL of a 10M aqueous HCl solution comprising 0.005M Co (II) and 0.01M Pt(IV) added as H$_2$PtClO$_6$.3H$_2$O and CoCl$_{2.6}$H$_2$O (supplied by Alfa Aesar) at 25° C. were introduced 0.25 g of [P$_{44414}$][Cl]. Without heating, a phase separation takes place, namely:
- a green upper phase: the phase enriched in $\varphi_{IL}$ ionic liquid comprising cobalt (II) and platinum (IV), and
- an almost colorless lower phase: the phase enriched in water $\varphi_W$.

The partition coefficient of the metal ion Pt(IV) between the two phases $\varphi_{IL}$ and $\varphi_W$ was $$K(Pt(IV))_n = [Pt(IV)]\varphi_{IL}/[Pt(IV)]\varphi_W > 100$$

[P$_{44414}$][Cl]—HCl—H$_2$O thus made it possible to obtain a quantitative extraction of platinum and cobalt towards the phase rich in ionic liquid $\varphi_{IL}$.

The two phases $\varphi_{IL}$ and $\varphi_W$ were separated. To the phase enriched in isolated $\varphi$IL ionic liquid was added 1.5 ml of 1M aqueous HCl solution, which induced the precipitation of platinum (in the form of an insoluble salt of PtCl$_6^{2-}$), since platinum is not soluble in an aqueous solution so little acidic. A mixture comprising:
- a salt which precipitates at the bottom which consists of PtCl$_6^2$ and
- a single liquid phase comprising water, cobalt, [P$_{44414}$][Cl] and HCl, was obtained.

Figure 3:
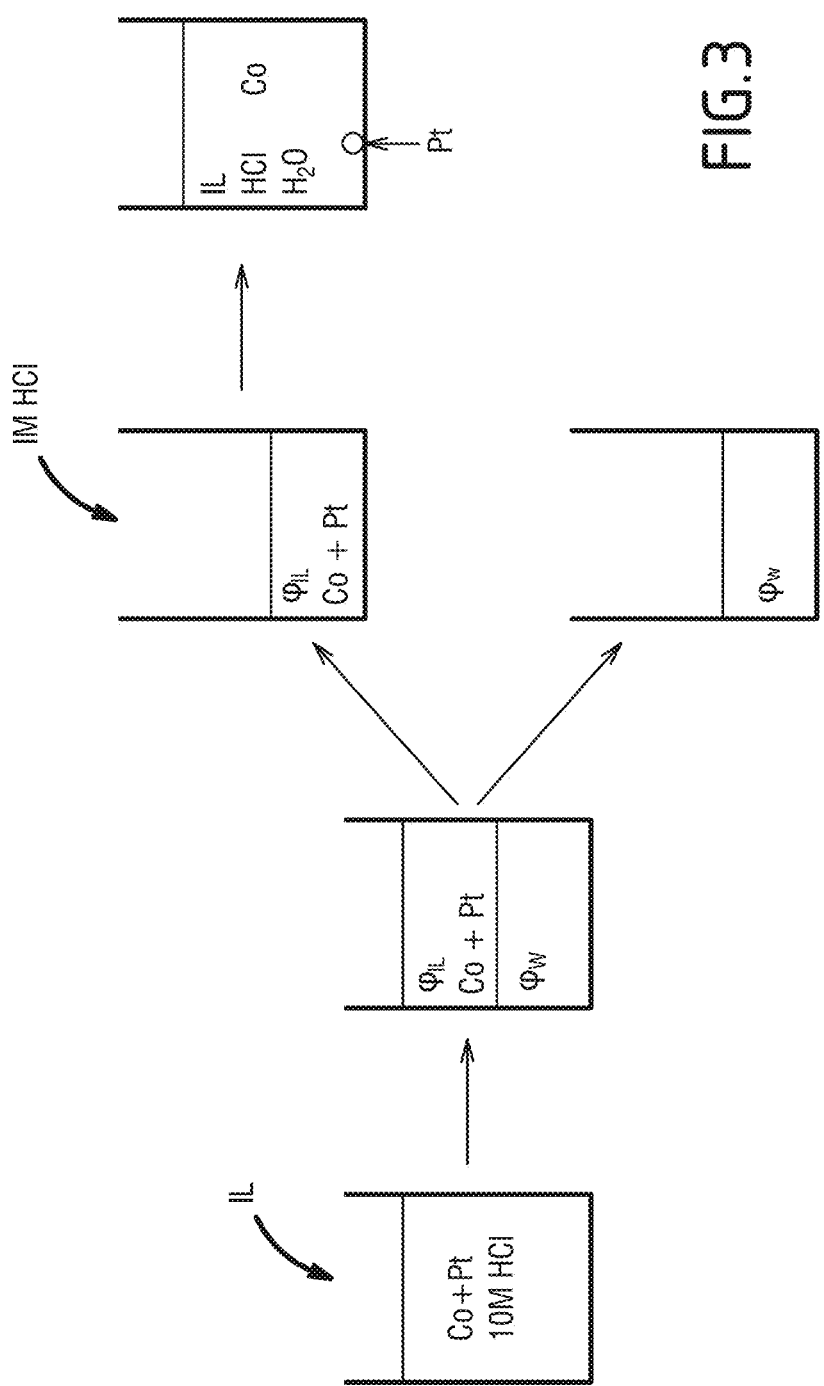
FIG. 3 shows a diagram of the protocol followed in Example 4.

The protocol followed is shown in FIG. 3.

The invention claimed is:

1. Method for extracting a metal ion M from a medium, comprising the steps of:
   a) contacting an ionic liquid of formula $C^+,(X^{p-})_{1/p}$, in which:
      $C^+$ is an onium cation comprising at least one atom selected from N, S, P or O, the onium cation comprising at least one hydrocarbon chain R$^1$ comprising from 6 to 20 carbon atoms, optionally interrupted by one or more groups selected from —S—, —O—, —(C=O)—O—, —O—(C=O)—, —NR$^{10}$—(C=O)—, —(C=O)—NR$^{11}$— or —NR$^{12}$R$^{13}$—, and/or optionally substituted with one or more groups selected from halogen, —$OR^{14}$, —(C=O)$R^{15}$, —(C=O)$NR^{16}R^{17}$—, —$NR^{18}R^{19}R^{20}$, —S—$R^{21}$, —(C=O)—$OR^{22}$, wherein $R^{10}$, $R^{11}$, $R^{12}$, $R^{13}$, $R^{14}$, $R^{15}$, $R^{16}$, $R^{17}$, $R^{18}$, $R^{19}$, $R^{20}$ and $R^{21}$ independently represent H or a linear or branched hydrocarbon chain comprising from 1 to 6 carbon atoms and $R^{22}$ represents a linear or branched hydrocarbon chain comprising from 1 to 6 carbon atoms, and $X^{p-}$ is an anion charge of p, the ionic liquid having a solubility in water at 20° C. of at least 10 g/L, with an aqueous medium comprising a metal ion M and an acid, wherein a composition is obtained at a temperature $T_i$, the composition comprising a single liquid phase, b) varying the temperature to obtain a composition at a temperature $T_f$ different from $T_i$ comprising two liquid phases $\varphi_{IL}$ and $\varphi_W$, the liquid phase $\varphi_{IL}$ being a phase enriched in ionic liquid and the liquid phase $\varphi_W$ being a phase enriched in water, the pH is less than or equal to 4.7, with the proviso that, at temperature $T_f$, the partition coefficient of the metal ion between the two phases $\varphi_{IL}$ and $\varphi_W$:

$K(M)_{Tf}=[M]\varphi_{IL}/[M]\varphi_W$ in which $[M]_{\varphi IL}$ is the concentration in M in the phase $\varphi_{IL}$ at the temperature $T_f$ and $[M]\varphi_W$ is the concentration in M in the phase $\varphi_W$ at the temperature $T_f$, is greater than 1, c) separating the phases $\varphi_{IL}$ and $\varphi_W$ of the composition obtained in step b), then d) optionally extracting the metal ion M from the phase $\varphi_{IL}$.

2. Method for separating metal ions $M_1$ and $M_2$, comprising the steps of:

a') contacting an ionic liquid of formula $C^+,(X^{p-})_{1/p}$, in which:

C$^+$ is an onium cation comprising at least one atom selected from N, S, P or O, the onium cation comprising at least one hydrocarbon chain $R^1$ comprising from 6 to 20 carbon atoms, optionally interrupted by one or more groups selected from —S—, —O—, —(C=O)—O—, —O—(C=O)—, —$NR^{10}$—(C=O)—, —(C=O)—$NR^{11}$— or —$NR^{12}R^{13}$—, and/or optionally substituted with one or more groups selected from an halogen, —$OR^{14}$, —(C=O)$R^{15}$, —(C=O)$NR^{16}R^{17}$—, —$NR^{18}R^{19}R^{20}$, —S—$R^{21}$, —(C=O)—$OR^{22}$, wherein $R^{10}$, $R^{11}$, $R^{12}$, $R^{13}$, $R^{14}$, $R^{15}$, $R^{16}$, $R^{17}$, $R^{18}$, $R^{19}$, $R^{20}$ and $R^{21}$ independently represent H or a linear or branched hydrocarbon chain comprising from 1 to 6 carbon atoms and $R^{22}$ represents a linear or branched hydrocarbon chain comprising from 1 to 6 carbon atoms, and $X^{p-}$ is an anion of charge p, wherein the ionic liquid has a solubility in water at 20° C. of at least 10 g/L, with an aqueous medium comprising two metal ions $M_1$ and $M_2$ (of different natures) and an acid, wherein a composition is obtained at a temperature $T_i$, and wherein the composition comprises a single liquid phase, b') varying the temperature to obtain a composition at a temperature $T_f$ different from $T_i$ comprising two liquid phases $\varphi_{IL}$ and $\varphi_W$, the liquid phase $\varphi_{IL}$ being a phase enriched in ionic liquid and the liquid phase $\varphi_W$ being a phase enriched in water, of which the pH is less than or equal to 4.7, provided that, at the temperature $T_f$, the separation factor $b(M_1/M_2)_{Tf}$ corresponding to the ratio between the partition coefficients of $M_1$ and $M_2$ $\beta$ $\beta(M_1/M_2)_{Tf}=K(M_1)_{Tf}/K(M_2)_{Tf}=([M_1]\varphi_{IL}/[M_1]\varphi_W)/([M_1]\varphi_{IL}/[M_1]\varphi_W)$ in which:

$K(M_1)_{Tf}$ is the partition coefficient at the temperature $T_f$ of the metal ion $M_1$ between the two phases $\varphi_{IL}$ and $\varphi_W$, with $K(M_1)_{Tf}=[M_1]\varphi_{IL}/[M_1]\varphi_W$, $K(M_1)_{Tf}$ is the partition coefficient at the temperature $T_f$ of the metal ion $M_2$ between the two phases $\varphi_{IL}$ and $\varphi_W$, with $K(M_2)_{Tf}=[M_2]\varphi_{IL}/[M_2]\varphi_W$ $[M_1]_{\varphi IL}$ is the concentration in $M_1$ in the phase $\varphi_{IL}$ at the temperature $T_f$ and $[M_1]\varphi_W$ is the concentration in $M_1$ in the phase $\varphi_W$ at the temperature $T_f$, $[M_2]_{\varphi IL}$ is the concentration in $M_2$ in the phase $\varphi_{IL}$ at the temperature $T_f$ and $[M_2]\varphi_W$ is the concentration in $M_2$ in the phase $\varphi_W$ at the temperature $T_f$, is greater than 1, c') separating the phases $\varphi_{IL}$ and $\varphi_W$ of the composition obtained in step b'), then d') optionally extracting the metal ion $M_1$ from the phase $\varphi_{IL}$, e') optionally extracting the metal ion $M_2$ from the phase $\varphi_W$.

3. Method for separating metal ions $M_1$ and $M_2$ comprising the steps of:

a") contacting an ionic liquid of formula $C^+,(X^{p-})_{1/p}$, wherein:

C$^+$ is an onium cation comprising at least one atom selected from N, S, P or O, the onium cation comprising at least one hydrocarbon chain $R^1$ comprising from 6 to 20 carbon atoms, optionally interrupted by one or more groups selected from —S—, —O—, —(C=O)—O—, —O—(C=O)—, —$NR^{10}$—(C=O)—, —(C=O)—$NR^{11}$— or —$NR^{12}R^{13}$—, and/or optionally substituted with one or more groups selected from a halogen, —$OR^{14}$, —(C=O)$R^{15}$, —(C=O)$NR^{16}R^{17}$—, —$NR^{18}R^{19}R^{20}$, —S—$R^{21}$, —(C=O)—$OR^{22}$, wherein $R^{10}$, $R^{11}$, $R^{12}$, $R^{13}$, $R^{14}$, $R^{15}$, $R^{16}$, $R^{17}$, $R^{18}$, $R^{19}$, $R^{20}$ and $R^{21}$ independently represent H or a linear or branched hydrocarbon chain comprising from 1 to 6 carbon atoms and $R^{22}$ represents a linear or branched hydrocarbon chain comprising from 1 to 6 carbon atoms, and $X^{p-}$ is an anion of charge p, wherein the ionic liquid has a solubility in water at 20° C. of at least 10 g/L, with an aqueous medium comprising an acid and two metal ions $M_1$ and $M_2$ (of different natures), wherein a composition is obtained at a temperature $T_i$, the composition comprising:

either a single liquid phase, or two liquid phases $\varphi_{IL}$ and $\varphi_W$, the liquid phase $\varphi_{IL}$ being a phase enriched in ionic liquid and the liquid phase $\varphi_W$ being a phase enriched in water, whose pH is less than or equal to 4.7, provided that at temperature $T_i$:

the partition coefficient of the metal ion $M_1$ between the two phases $\varphi_{IL}$ and $\varphi_W$:

$K(M_1)_{Ti}=[M_1]\varphi_{IL}/[M_1]\varphi_W$ is greater than 1, the partition coefficient of the metal ion M2 between o the two phases φIL and φW:

$K(M_1)_{Ti}=[M_1]\varphi_{IL}/[M_1]\varphi_W$ is greater than 1, b") when a composition comprising a single liquid phase is obtained in step a"), varying the temperature to obtain a composition at a temperature Tf different from Ti comprising two liquid phases φIL and φW, the liquid phase φIL being a phase enriched in ionic liquid and the liquid phase φW being a phase enriched in water, whose pH is less than or equal to 4.7, provided that at the temperature Tf: the partition coefficient of the metal ion M1 between the two phases φIL and φW:

$K(M_1)_{Tf} = [M_1]\varphi_{IL}/[M_1]\varphi_W$ is greater than 1, the partition coefficient of the metal ion $M_2$ between the two phases φIL and φW:

$K(M_2)_{Tf} = [M_2]\varphi_{IL}/[M_2]\varphi_W$ is greater than 1,
c") to separate the phases $\varphi_{IL}$ and $\varphi_W$ of the composition obtained in step a") or b"), then
d") contacting, at a temperature $T_\Omega$, the $\varphi_{IL}$ phase with an aqueous solution such that:
the solubility in the aqueous solution at the temperature $T_\Omega$ of $M_1$ is greater than or equal to 0.01 mol/l,
the solubility in the aqueous solution at the temperature $T_\Omega$ of $M_2$ is less than or equal to 0.001 mol/l,
wherein $M_2$ precipitates and a medium Ω comprising a solid comprising $M_2$ and at least one liquid phase comprising $M_1$ is obtained,
e") optionally filtering the medium Ω to recover the solid comprising $M_2$,
f") optionally extracting the metal ion $M_1$ from the liquid phase.

4. Method for purifying an acidic aqueous solution comprising a metal ion M comprising the steps of:
i) contacting an ionic liquid of formula $C^+,(X^{p-})_{1/p}$, in which:
$C^+$ is an onium cation comprising at least one atom selected from N, S, P or O, the onium cation comprising at least one hydrocarbon chain $R^1$ comprising from 6 to 20 carbon atoms, optionally interrupted by one or more groups selected from —S—, —O—, —(C=O)—O—, —O—(C=O)—, —NR$^{10}$—(C=O)—, —(C=O)—NR$^{11}$— or —NR$^{12}$R$^{13}$—, and/or optionally substituted with one or more groups selected from halogen, —OR$^{14}$, —(C=O)R$^{15}$, —(C=O)NR$^{16}$R$^{17}$—, —NR$^{18}$R$^{19}$R$^{20}$, —S—R$^{21}$, —(C=O)—OR$^{22}$, wherein R$^{10}$, R$^{11}$, R$^{12}$, R$^{13}$, R$^{14}$, R$^{15}$, R$^{16}$, R$^{17}$, R$^{18}$, R$^{19}$, R$^{20}$ and R$^{21}$ independently represent H or a linear or branched hydrocarbon chain comprising from 1 to 6 carbon atoms and R$^{22}$ represents a linear or branched hydrocarbon chain comprising from 1 to 6 carbon atoms, and
$X^{p-}$ is an anion of charge p,
the ionic liquid having a solubility in water at 20° C. of at least 10 g/L,
with an aqueous solution S comprising a metal ion M at a $[M]_S$ concentration and an acid, wherein a composition is obtained at a temperature $T_i$, the composition comprising a single liquid phase,
ii) varying the temperature to obtain a composition at a temperature $T_f$ different from $T_i$ comprising two liquid phases $\varphi_{IL}$ and $\varphi_W$, the liquid phase $\varphi_{IL}$ being a phase enriched in ionic liquid and the liquid phase $\varphi_W$ being a phase enriched in water, the pH is less than or equal to 4.7, provided that, at the temperature $T_f$, the partition coefficient of the metal ion between the two phases $\varphi_{IL}$ and $\varphi_W$:

$K(M)_{Tf} = [M]\varphi_{IL}/[M]\varphi_W$ is greater than 1,
iii) separating the phases $\varphi_{IL}$ and $\varphi_W$ of the composition obtained in stage ii), wherein a phase $\varphi_W$ is obtained which is an acidic aqueous solution whose concentration of metal ion $M[M]\varphi_W$ is lower than the concentration $[M]_S$.

5. Method according to claim 1, comprising before step a), a step $a_0$) of preparing the aqueous medium comprising a metal ion M and an acid by leaching.

6. Method according to claim 1, wherein the ionic liquid has one of the following formulas:

(I)

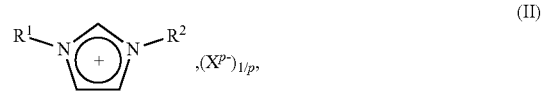

(II)

(III)

(IV)

(V)

in which:
$R^1$ and $X^{p-}$ are as defined in claim 1,
$R^2$, $R^3$ and $R^4$ independently represent a hydrocarbon chain comprising from 1 to 20 carbon atoms, optionally interrupted by one or more groups chosen from —S—, —O—, —(C=O)—O—, —O—(C=O)—, —NR$^{110}$—(C=O)—, —(C=O)—NR$^{111}$— or —NR$^{112}$R$^{113}$—, and/or optionally substituted by one or more groups chosen from a halogen, —OR$^{114}$, —(C=O)R$^{115}$, —(C=O)NR$^{116}$R$^{117}$—, —NR$^{118}$R$^{119}$R$^{120}$, —S—R$^{121}$, —(C=O)—OR$^{122}$, wherein R$^{110}$, R$^{111}$, R$^{112}$, R$^{113}$, R$^{114}$, R$^{115}$, R$^{116}$, R$^{117}$, R$^{118}$, R$^{119}$, R$^{120}$, R$^{121}$ and R$^{122}$ independently represent H or a linear or branched hydrocarbon chain comprising from 1 to 6 carbon atoms,
wherein two groups selected from $R^1$, $R^2$, $R^3$ and $R^4$ may be connected to form a ring.

7. Method according to claim 6 wherein the $R^1$ chain comprises at least 8 carbon atoms.

8. Method according to claim 5, wherein the $C^+$ cation comprises, in addition to the hydrocarbon chain $R^1$, a hydrocarbon chain $R^2$ comprising from 2 to 20 carbon atoms, in particular from 4 to 20 carbon atoms optionally interrupted by one or more groups selected from —S—, —O—, —(C=O)—O—, —O—(C=O)—, —NR$^{210}$—(C=O)—, —(C=O)—NR$^{211}$— or —NR$^{212}$R$^{213}$—, and/or optionally substituted with one or more groups selected from halogen, —OR$^{214}$, —(C=O)R$^{215}$, —(C=O)NR$^{216}$R$^{217}$—, —NR$^{218}$R$^{219}$R$^{220}$, —S—R$^{221}$, —(C=O)—OR$^{222}$, wherein R$^{210}$, R$^{211}$, R$^{212}$, R$^{213}$, R$^{214}$, R$^{215}$, R$^{216}$, R$^{217}$, R$^{218}$, R$^{219}$, R$^{220}$, R$^{221}$ and R$^{222}$ independently represent H or a linear or branched hydrocarbon chain comprising from 1 to 6 carbon atoms, wherein the groups R$^1$ and R$^2$ may be connected to form a ring.

9. Method according to claim 6, wherein the ionic liquid has one of the following formulas

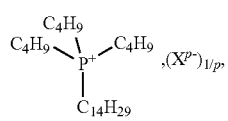 (X)

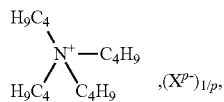 (XI)

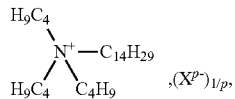 (XII)

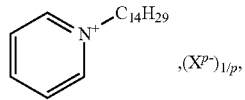 (XIII)

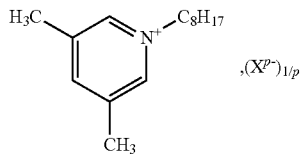 (XIV)

in which X$^{p-}$ is an anion of charge p.

10. Method according to claim 6, wherein the anion X$^{p-}$ is selected from anions BF$_4^-$, PF$_6^-$, CF$_3$SO$_3^-$, HSO$_4^-$, SO$_4^{2-}$, NO$_3^-$, CH$_3$COO$^-$, CF$_3$CO$_2^-$, ClO$_4^-$, HPO$_4^{2-}$, H$_2$PO$_4^-$, halides, anions BR$^5_4{}^-$, RCO$_2^-$ or R$^5$SO$_3^-$, R$^5$ being a linear or branched alkyl group having from 1 to 4 carbon atoms.

11. Method according to claim 1, wherein the pH of the water-enriched phase φW is less than 4.0.

12. Method according to claim 1, wherein the acid is:
an organic acid chosen from formic acid, acetic acid, oxalic acid, lactic acid, uric acid, p-toluenesulphonic acid, trifluoromethanesulphonic acid or a mixture thereof,
an inorganic acid chosen from hydrochloric acid, sulfuric acid, nitric acid, phosphoric acid or a mixture thereof,
or a mixture thereof.

13. Method according to claim 1, wherein the acid has the formula H$_p$(X$^{p-}$), where is X$^{p-}$ is the anion of charge p of the ionic liquid of the composition.

* * * * *